United States Patent [19]
Stanley

[11] Patent Number: 6,007,095
[45] Date of Patent: Dec. 28, 1999

[54] VEHICLE OCCUPANT POSITION SENSOR

[75] Inventor: James G. Stanley, Novi, Mich.

[73] Assignee: Automotive Systems Laboratory, Inc., Farmington Hills, Mich.

[21] Appl. No.: 09/018,409

[22] Filed: Feb. 4, 1998

Related U.S. Application Data

[60] Provisional application No. 60/037,298, Feb. 5, 1997.

[51] Int. Cl.[6] ............................................... B60R 21/32
[52] U.S. Cl. ........................................ 280/735; 280/730.1
[58] Field of Search .................................. 280/735, 730.1

[56] References Cited

U.S. PATENT DOCUMENTS

| | | | |
|---|---|---|---|
| 4,691,569 | 9/1987 | Sato et al. | 73/596 |
| 5,031,154 | 7/1991 | Watanabe | 367/8 |
| 5,118,134 | 6/1992 | Mattes et al. | 280/735 |
| 5,330,226 | 7/1994 | Gentry et al. | 280/735 |
| 5,413,378 | 5/1995 | Steffens, Jr. et al. | 280/735 |
| 5,626,359 | 5/1997 | Steffens, Jr. et al. | 280/735 |
| 5,653,462 | 8/1997 | Breed et al. | 280/735 |

OTHER PUBLICATIONS

Sound Reproduction Technology: http://www.atcsd.com Internet Web Page Dated Sep. 24, 1996.
American Technology Announces Major Breakthrough in Sound Reproduction: Press Release from http://www.atcsd-.com Internet Web Site Dated Sep. 24, 1996.
American Technology Completes Financing for Its Hypersonic Sound Technology:Press Release from http://www.atcsd.com Internet Web Site Dated Sep. 24, 1996.
HyperSonic Sound: http://www.atcsd.com/HTML/whitepaper.html Dated Feb. 2, 1998.

*Primary Examiner*—Kenneth R Rice
*Attorney, Agent, or Firm*—Lyon P.C.

[57] ABSTRACT

A plurality of ultrasonic transmitters, at distinct locations and with distinct transmitting frequencies, direct beams of ultrasonic sound waves at a one or more detection regions of space. The amplitude of the ultrasonic sound waves is sufficient to generate from each detection region a sound wave having a frequency corresponding to the difference of the frequencies of the respective ultrasonic sound waves. A receiver disposed proximate to the ultrasonic transmitters detects the generated sound wave. An object occupying the detection region blocks one or more of the beams, and is detected therein when the magnitude of the generated sound wave is below a threshold. In another aspect of the instant invention, the ultrasonic transmitters are adapted to transmit pulses forming relatively broad spherical wavefronts which intersect to form a circular detection region which propagate with time, thereby enabling the detection of a profile of an object.

18 Claims, 5 Drawing Sheets

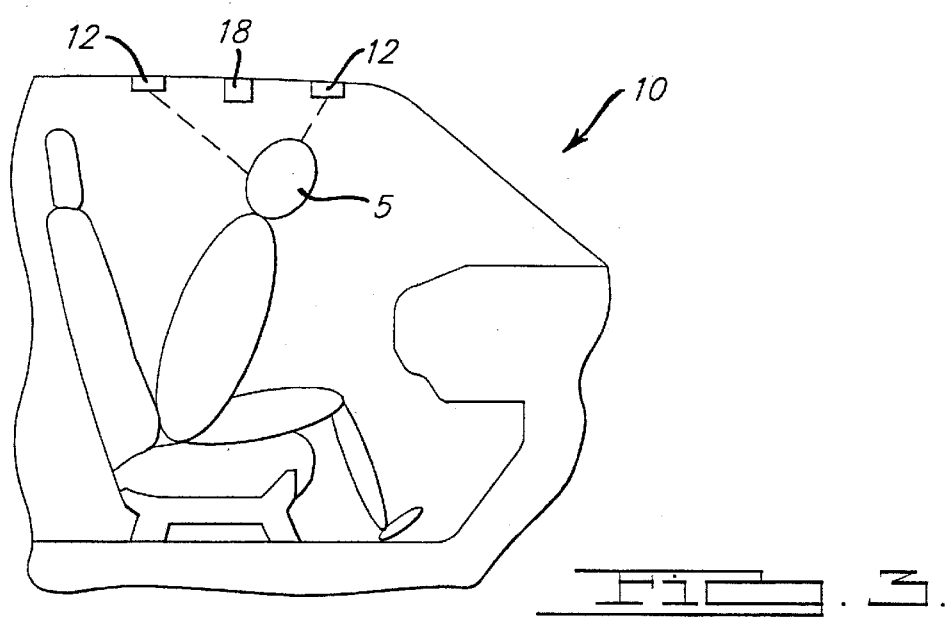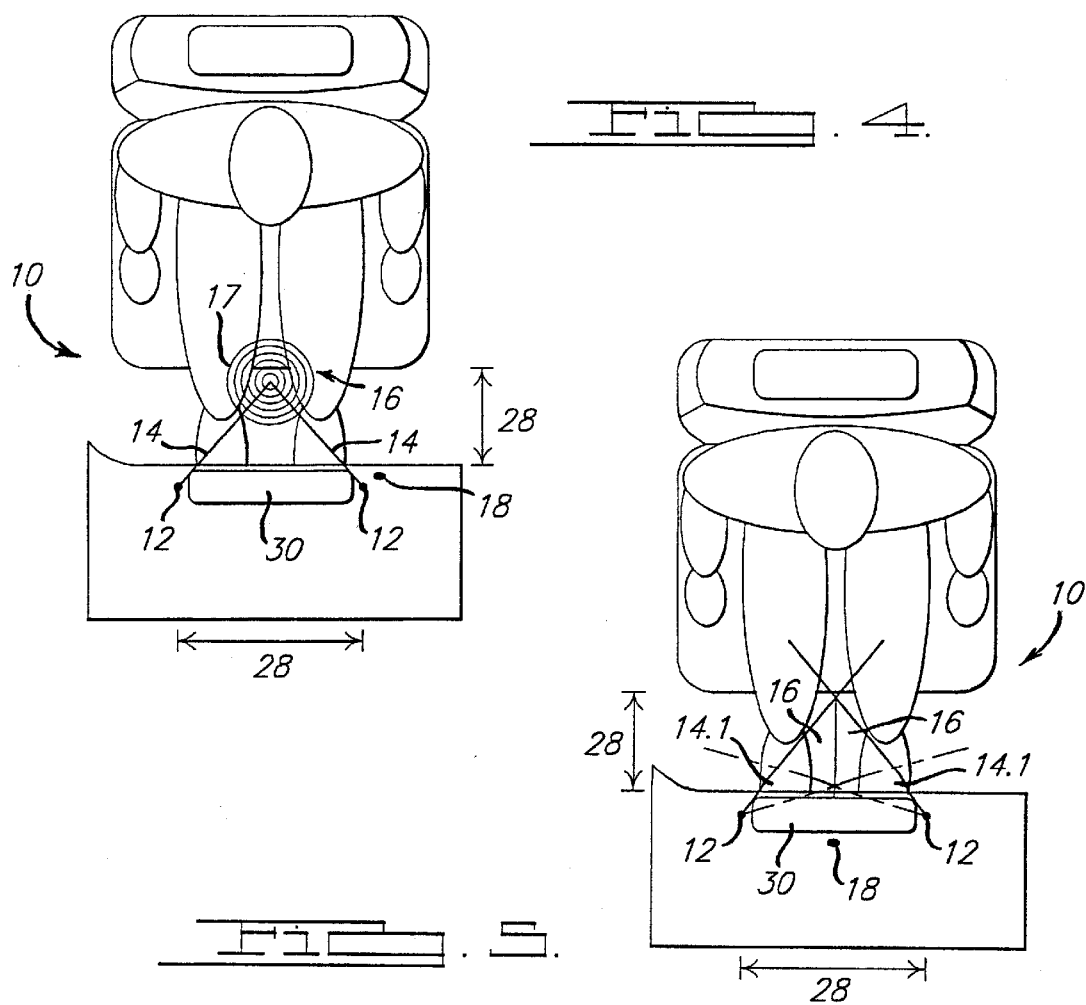

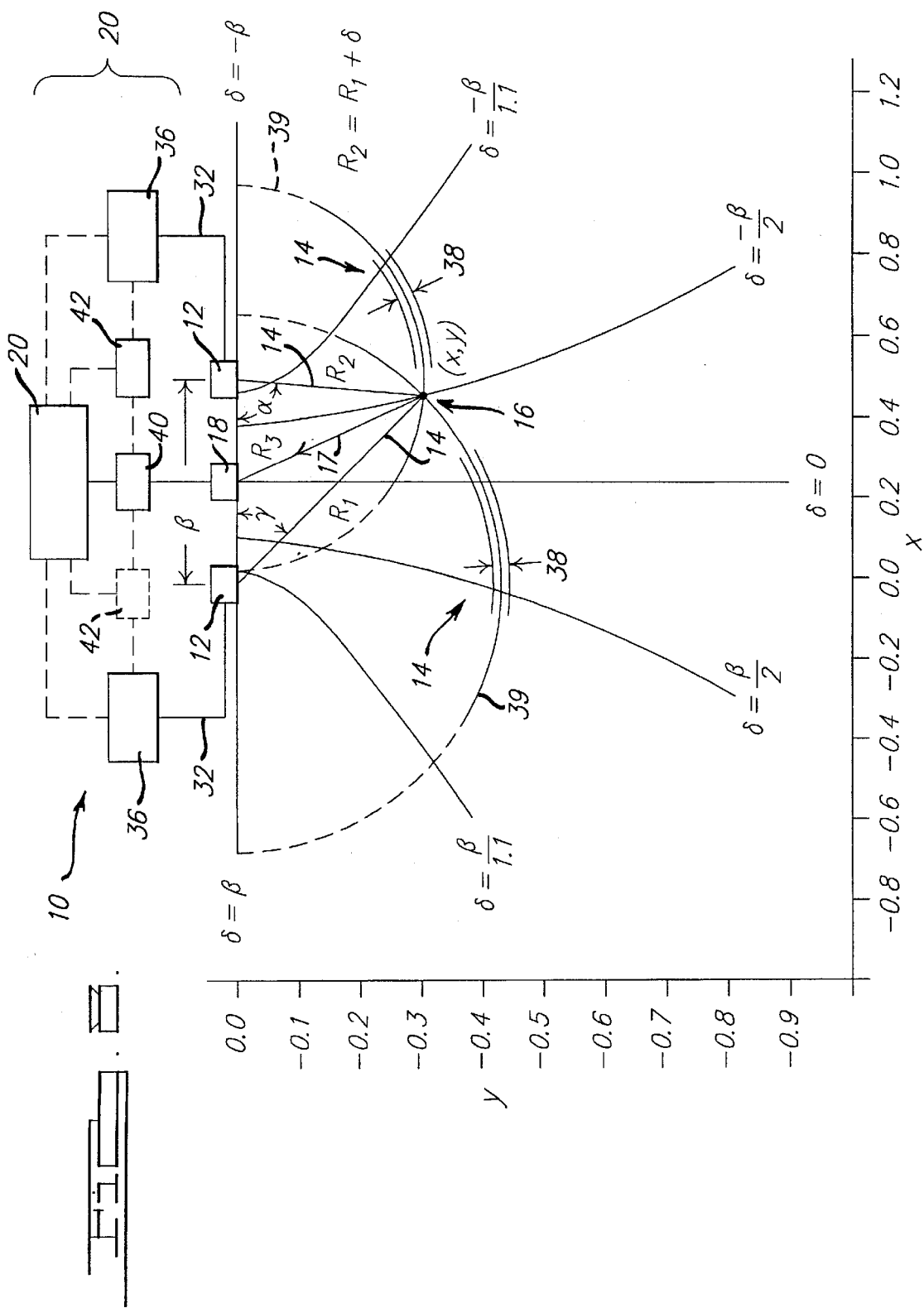

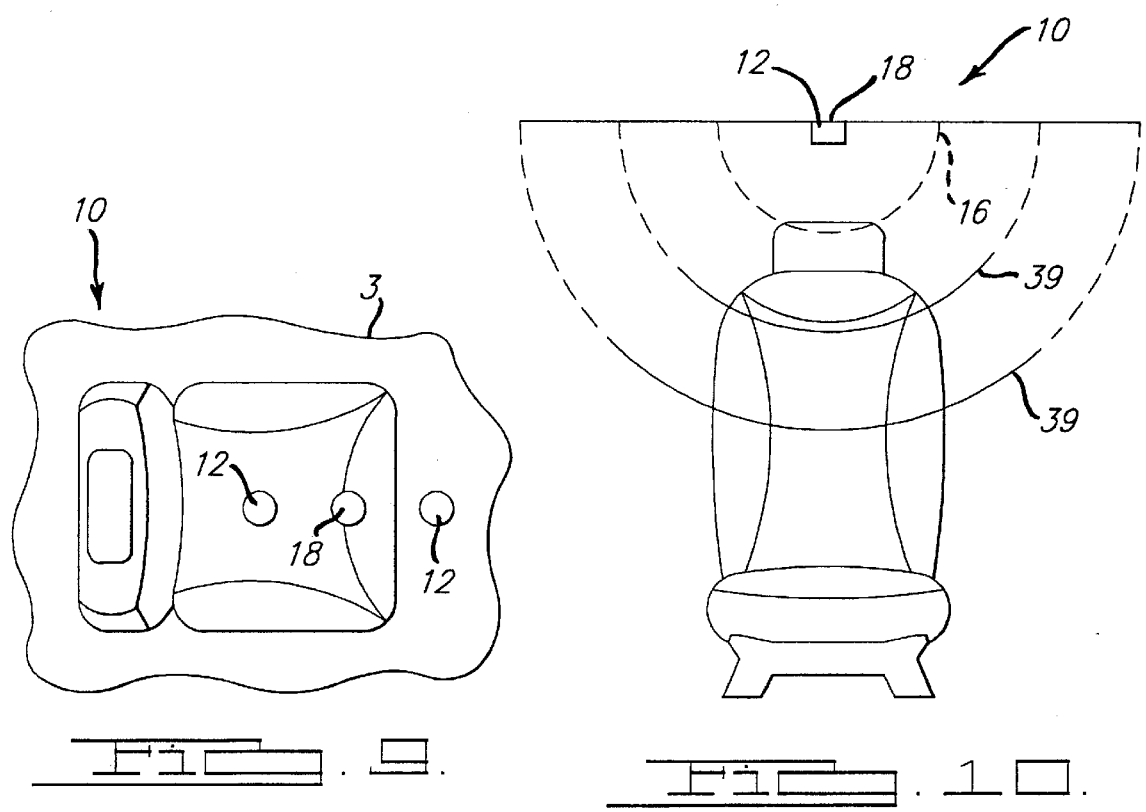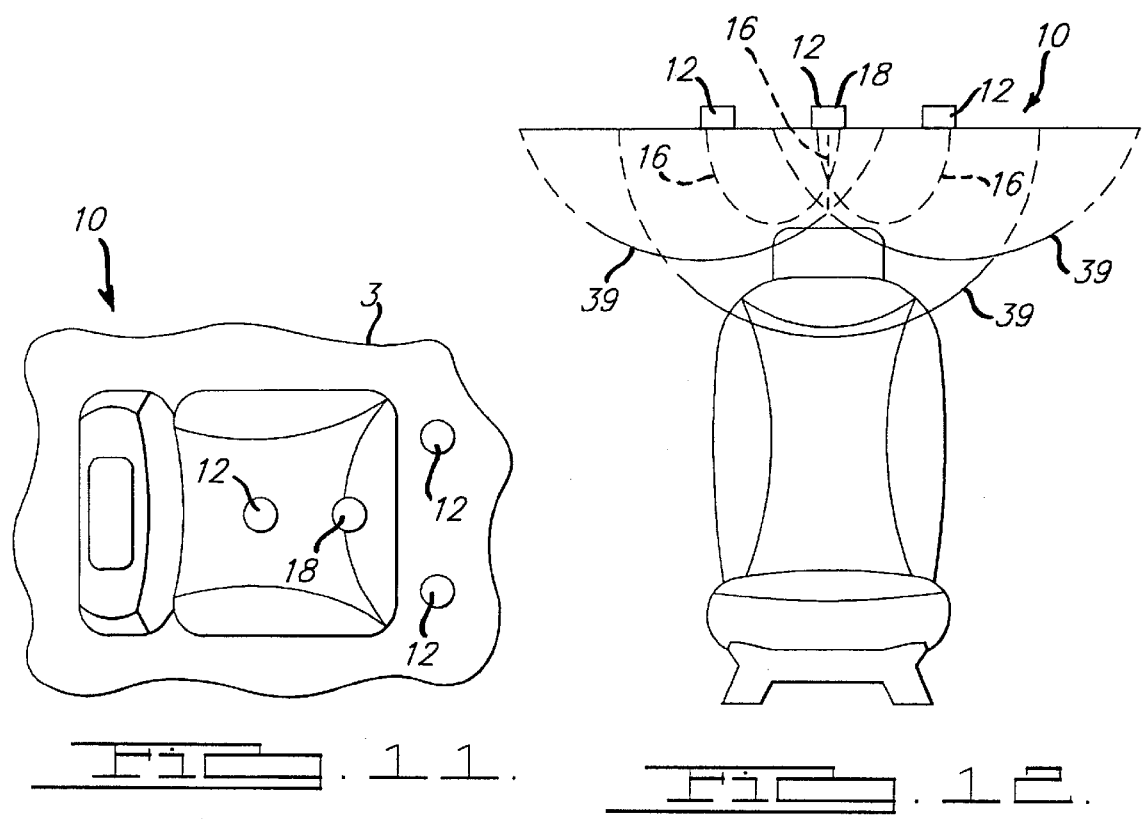

VEHICLE OCCUPANT POSITION SENSOR

CROSS-REFERENCE TO RELATED APPLICATIONS

The instant application claims the benefit of prior U.S. Provisional Application Ser. No. 60/037,298 filed on Feb. 5, 1997.

TECHNICAL ART

The instant invention generally relates to systems for detecting the presence or profile of an object and more particularly to an object detecting system for use in a vehicle with an occupant safety restraint system to enhance occupant safety.

BACKGROUND OF THE INVENTION

A vehicle may contain automatic safety restraint actuators that are activated responsive to a vehicle crash for purposes of mitigating occupant injury. Examples of such restraint actuators include air bags, seat belt pretensioners, and deployable knee bolsters.

One objective of an automatic safety restraint system is to mitigate occupant injury, thereby not causing more injury with the automatic restraint system than would be caused by the crash had the automatic restraint system not been activated. Notwithstanding the protective benefit of these automatic safety restraint actuators, there is generally both a risk and a cost associated with the deployment thereof. Generally, it is desirable to only activate automatic safety restraint actuators when needed to mitigate injury because of the expense of replacing the associated components of the safety restraint system, and because of the potential for such activations to harm occupants. This is particularly true of air bag restraint systems, wherein occupants too close to the air bag at the time of deployment—i.e. out-of-position occupants—are vulnerable to injury or death from the deploying air bag even when the associated vehicle crash is relatively mild. Moreover, occupants who are of small stature or with weak constitution, such as children, small adults or people with frail bones are particularly vulnerable to injury induced by the air bag inflator. Furthermore, infants properly secured in a normally positioned rear facing infant seat (RFIS) in proximity to a front seat passenger-side air bag are also vulnerable to injury or death from the deploying air bag because of the close proximity of the infant seat's rear surface to the air bag inflator module.

Air bag inflators are designed with a given restraint capacity, as for example, the capacity to protect an unbelted normally seated fiftieth percentile occupant when subjected to a 30 MPH barrier equivalent crash, which results in associated energy and power levels which can be injurious to out-of-position occupants. While relatively infrequent, cases of injury or death caused by air bag inflators in crashes for which the occupants would have otherwise survived relatively unharmed have provided the impetus to reduce or eliminate the potential for air bag inflators to injure the occupants which they are intended to protect.

One technique for mitigating injury to occupants by the air bag inflator is to reduce the power and energy levels of the associated air bag inflator, for example by reducing the amount of gas generant in the air bag inflator, or the inflation rate thereof. This reduces the risk of harm to occupants by the air bag inflator while simultaneously reducing the restraint capacity of the air bag inflator, which places occupants a greater risk for injury when exposed to higher severity crashes.

Another technique for mitigating injury to occupants by the air bag inflator is to control the rate of inflation rate or the capacity of the inflator responsive to a measure of the severity of the crash. However, the risk of injury to such occupants would not be mitigated under the conditions of higher crash severity when the inflator is intentionally made aggressive in order to provide sufficient restraint for normally positioned occupants.

Yet another technique for mitigating injury to occupants by the air bag inflator is to control the activation of the air bag inflator responsive to the presence, position, and size of the occupant, or to the severity of the crash. For example, the air bag inflator can be disabled if the occupant weight is below a given threshold. Moreover, the inflation capacity can be adjusted by controlling the number of inflation stages of a multi-stage inflator that are activated. Furthermore, the inflation power can be adjusted by controlling the time delay between the firings of respective stages of a multi-stage inflator.

One measure of restraint capacity of an air bag inflator is the amount of occupant kinetic energy that can be absorbed by the associated air bag system, whereby when the occupant collides with the gas filled air bag, the kinetic energy of the occupant is converted to potential energy via the pressurization of the air bag, and this potential energy is dissipated by venting pressurized gases from the air bag. As a vehicle in a crash is decelerated, the velocity of an unrestrained occupant relative to the vehicle increases. Preferably, the occupant restraint process is commenced early in the crash event so as to limit the amount of occupant kinetic energy that must be absorbed and thereby minimize the associated restraint forces and accelerations of and loads within the occupant. If the occupant were a simple inertial mass without friction relative to the vehicle, the kinetic energy of the occupant would be given by $½ M \cdot V^2$, where M is the mass of the occupant and V is the occupant velocity relative to the vehicle. If a real occupant were represented by an interconnected set of bodies, some of which have friction relative to the vehicle, each body of which may have differing velocities relative the vehicle, the above equation would apply to the motion of the center of gravity of the occupant. Regardless of the representation, occupants of larger mass will have a larger kinetic energy for the same velocity relative to the vehicle. Therefore, an occupant weight sensor is useful in an air bag system with variable restraint capacity to enable the restraint capacity to be preferentially adapted to the weight, or mass, of the occupant.

Except for some cases of oblique or side-impact crashes, it is generally desirable to not activate an automatic safety restraint actuator if an associated occupant is not present because of the otherwise unnecessary costs and inconveniences associated with the replacement of a deployed air bag inflation system. Occupant presence can be detected by a seat weight sensor adapted to provide either a continuous measure of occupant weight or to provide a binary indication if the occupant weight is either above or below a specified weight threshold.

Known methods for detecting the position of a seated vehicle occupant have been developed that incorporate detection systems having infrared beams, ultra-sound beams, capacitive sensors, CCD camera sensors and passive infrared detectors.

Known ultrasound beams use conventional methods of sending out an acoustic pulse and measuring the time delay before the reflected pulse returns. In order to obtain a three dimensional profile of an occupant's position using the known beam based methods, a system would require many individual beams each having a corresponding dedicated receiver.

With respect to the other noted arrangements, passive type systems do not work well in extremely warm environments. Capacitive sensor type systems are only proximity sensors with no ability to give profile information. CCD systems require complex image analysis software and optical hardware to produce three dimensional information, and thus are potentially cost prohibitive.

Sound waves are typically generated directly from the motion of a vibrating surface such as a speaker cone. Sound waves may also be generated in mid air by mixing two separate sound waves each of a distinct frequency and of sufficient amplitude so that the non-linearity of the air generates two additional sets of sound waves, one having a frequency given by the difference in the frequencies of the original waves, the other having a frequency given by the sum of the frequencies of the original waves, whereby the generated wave at the difference frequency has greater energy than the generated wave at the sum frequency. Mr. Elwood Norris of American Technology Corporation has developed what is referred to as a "HyperSonic Sound" system (HSS™) which incorporates this principle by mixing two ultrasonic waves which differ in frequency by an amount which corresponds to an audio signal so as to generate high fidelity sound in mid air as an improvement to the conventional loudspeaker. For example, a 200 KHz wave and a 210 KHz wave simultaneously generating by a common ultrasonic transducer generate an audible 10 KHz sonic wavefront along the ultrasonic beam emitted by the ultrasonic transducer. This HyperSonic™ Sound is explained further in a white paper of the same title available from the American Technology Corporation World Wide Web site at http://www.atcsd.com/HTML/whitepaper.html. The HSS™ is used as a replacement for an audio speaker system, and generates the difference wave from separate ultrasonic beams generated by a common ultrasonic transducer. However, the literature on HSS™ does not teach the use of separate ultrasonic transducers for purposes of detecting objects or the profile thereof.

SUMMARY OF THE INVENTION

The instant invention is capable of determining the position of a person in a vehicle seat by using three-dimensional profiling with a fixed set of transducers and a single receiver. The instant invention utilizes a plurality of ultrasonic transmitters to provide active three dimensional sampling of an occupant space to determine if there is a body part (or other mass) in that volume of space. Since the instant invention is responsive non-linear effects created by interference of the respective sound waves, the processing system is able to reliably distinguish between instances of sound waves hitting a dense mass and not hitting a dense mass. The profile information can be used in conjunction with a "smart" air bag restraint system. The position of the occupant can be used (along with crash severity and other occupant information) to determine whether an air bag should be deployed, and if so, when the air bag should be deployed, the rate of deployment, and the ultimate stiffness of the bag.

In contrast to conventional ultrasound beam systems which operate by emitting a pulse and waiting for a return pulse, the instant invention can constantly transmit pulses because the profile information is not contained in a temporal delay, but rather in the creation of a sound difference. A sound difference from one space segment can be created while a sound difference created within another space segment is being received. The known delay between the creation of a sound and its reception allows for synchronization such that the sound difference can be created almost continuously in time, but at shifting locations in space to create a time multi-plexing scheme.

The instant invention could alternatively be implemented using a frequency multi-plexing scheme where a plurality of acoustic beams are transmitted simultaneously but mix at different locations to produce a number of different frequency sound differences. The receiver spectrally discriminates which beams interfered and which were blocked.

In addition, the system can use small piezoelectric transducers as acoustic radiation sources. Thus, since only a single acoustic receiving system is required, the instant invention provides an inexpensive, yet rugged and unobtrusive occupant position detection system.

Accordingly, one object of the instant invention is to provide an improved

A further object of the instant invention is to provide an improved occupant position sensing system, which more accurately determines if an occupant is positioned within the danger-zone of the air bag inflator.

A yet further object of the instant invention is to provide an improved occupant position sensing system, which more accurately delineates the danger-zone proximate the air bag inflator.

A yet further object of the instant invention is to provide an improved occupant position sensing system, which warns occupants when they are at risk of injury from the air bag inflator.

A yet further object of the instant invention is to provide an improved occupant position sensing system, with improved detection of rear facing infant seats.

A yet further object of the instant invention is to provide an improved occupant position sensing system, with improved measurement of occupant position so as to enable improved occupant position dependent control of inflation.

A yet further object of the instant invention is to provide an improved occupant position sensing system, which reduces the likelihood of false position measurements due to occupant extremities or objects proximate the air bag inflator.

The instant invention will be more fully understood after reading the following detailed description of the preferred embodiment with reference to the accompanying drawings. While this description will illustrate the application of the instant invention in a vehicle with a safety restraint system to detect the presence or profile of an occupant for either controlling the activation of the safety restraint system or for activating a warning device if the occupant is positioned in the danger zone of the safety restraint system, it will be understood by one with ordinary skill in the art that the instant invention can also be applied to other systems for detecting the presence or profile of an object.

BRIEF DESCRIPTION OF THE DRAWINGS

FIG. 3 illustrates the operation of an instant invention when the detection region is occupied by the occupant.

FIG. 4 illustrates the incorporation of one embodiment of the instant invention proximate to an air bag inflator for purposes of detecting if an object is in the danger zone proximate to the air bag inflator.

FIG. 5 illustrates the incorporation of another embodiment of the instant invention proximate to an air bag inflator for purposes of detecting if an object is in the danger zone proximate to the air bag inflator.

FIG. 8 illustrates an aspect of the instant invention for detecting the profile of an object.

FIG. 9 illustrates an arrangement of elements of one embodiment of the instant invention having two ultrasonic transmitters, in accordance with the aspect of the instant invention illustrated in FIG. 8.

FIG. 10 illustrates, at an instant of time, the ultrasonic wavefronts generated by the respective ultrasonic transmitters in the embodiment of the instant invention illustrated in FIG. 9.

FIG. 11 illustrates an arrangement of elements of one embodiment of the instant invention having three ultrasonic transmitters, in accordance with the aspect of the instant invention illustrated in FIG. 8.

FIG. 12 illustrates, at an instant of time, the ultrasonic wavefronts generated by the respective ultrasonic transmitters in the embodiment of the instant invention illustrated in FIG. 11.

DETAILED DESCRIPTION OF THE PREFERRED EMBODIMENT(S)

Figure 1:
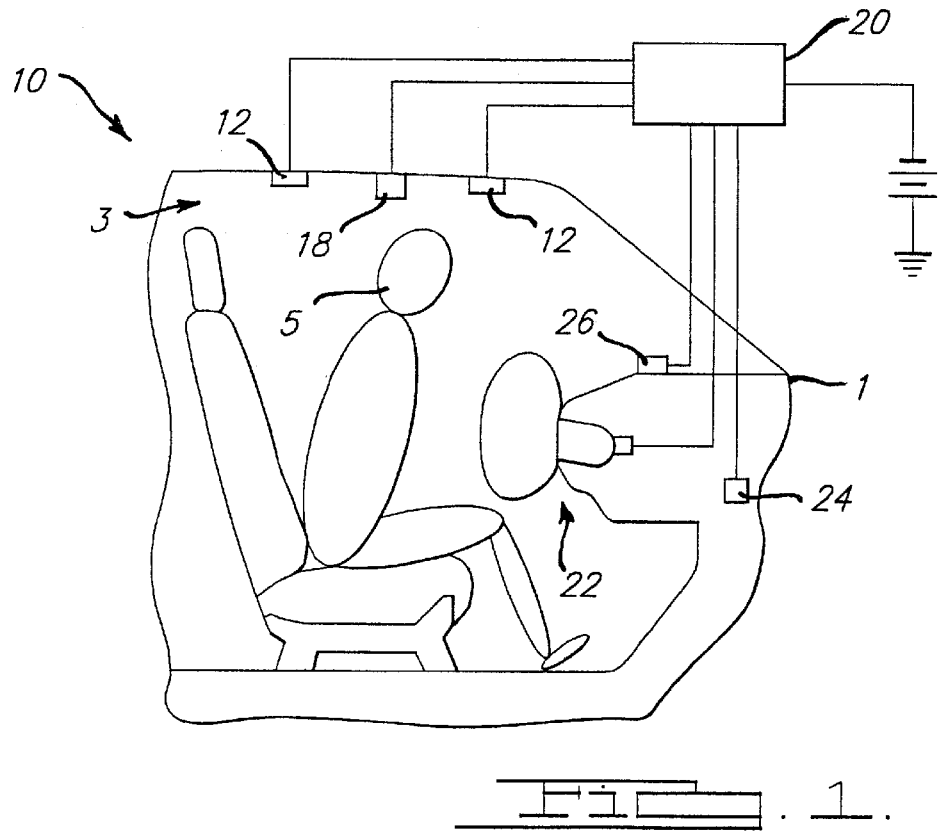
FIG. 1 illustrates the incorporation of the instant invention in a vehicle for controlling the activation of a safety restraint system responsive to the position of an occupant.
Figure 2:
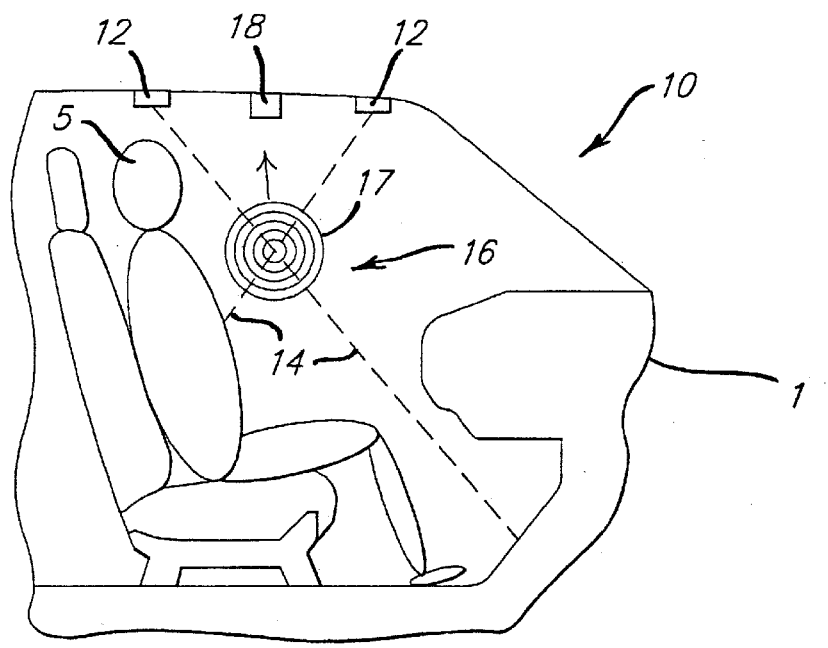
FIG. 2 illustrates the operation of an instant invention when the detection region is not occupied by the occupant.

Referring to FIG. 1, an occupant position sensor 10 is incorporated in a vehicle 1. A plurality of ultrasonic transducers 12 are disposed above the occupant seating location, for example in the headliner 3. As illustrated in FIG. 2, each ultrasonic transducer 12 generates an associated beam 14 of ultrasonic sound waves, from a distinct location and at a distinct frequency, that intersect at a detection region 16 in space. The amplitude of the separate beams 14 is sufficiently great so that the air within the detection region 16 acts as a non-linear mixer so as to create generated sound waves 17 that emanate from the region of space at a frequency corresponding to the difference between the frequencies of the respective beams 14 of ultrasonic sound waves. The generated sound waves 17 are detected by a receiver 18, also preferably disposed proximate the ultrasonic transducer 12 above the occupant 5. In one aspect of the instant invention, the beams 14 of ultrasonic sound waves are relatively narrow, and the detection region 16 is relatively localized. The ultrasonic transducers 12 are under control of a signal processor 20, which also senses the signal from the receiver 18 responsive to the generated sound waves 17. As illustrated in FIG. 2, when an occupant 5 is not occupying the detected region 16, the generated sound waves 17 are created in mid-air and propagate to the receiver 18 where they are detected. If the signal detected by the receiver 18 exceeds a threshold, then the signal processor 20 recognizes that an occupant is not occupying the detected region 16, and would therefore not be in danger of injury from the air bag safety restraint system 22, whereupon if a crash is detected by a crash sensor 24, the signal processor 20 generates a signal for activating safety restraint system 22. Alternately, as illustrated in FIG. 3, if the occupant 5 occupies the detection region 16, then the separate beams 14 of ultrasonic sound waves cannot mix within the detection region 16 so as to create the generated sound waves 17, whereupon either a warning device 26 is activated to warn the occupant of potential danger from the safety restraint system 22 if activated, or the activation of the safety restraint system 22 is either inhibited or otherwise modified responsive to the detection of a crash by the crash sensor 24.

The instant invention operates by detecting sound differences produced in mid-air as a result of non-linear interference effects of directed beams of ultrasonic energy. The manner in which the frequency sound difference is produced is based on the fact that when two interfering waves differ in frequency by an amount that is small relative to their frequencies, f1 and f2, the waves will drift in and out of phase at a point in the region of interference. The frequency of the drifting is known as the beat frequency, which is determined by taking the difference between f1 and f2, i.e., $f_{beat}=|(f1-f2)|$. Maximum amplitude occurs when the two interfering waves are in phase, and minimum amplitude occurs when the two waves are out of phase.

When amplitudes of the respective waves become sufficiently large, the corresponding amplitude during interference becomes very large and produces additional non-linear effects. More specifically, the pressure induced restoring forces which act on surrounding air molecules begins to have the magnitude of the square of the displacement from equilibrium.

This non-linear restoring force thus creates new oscillatory motions in the molecules, which in turn causes the propagation of new waves from the region of interference. In the case of sound waves, four new frequencies can be detected emanating from this region, i.e., the next higher harmonics of each respective principal frequency, a wave having a frequency equal to the difference between the principal frequencies, and a wave having a frequency equal to the sum of the principals.

In one illustrative embodiment of the instant invention, two ultrasonic beams at frequencies f1=200 kHz and f2=230 kHz are directed such that they will intersect in a space volume segment A. If there are clear paths to volume segment A from the two sources, a 30 kHz difference frequency (230 kHz–200 kHz=30 kHz) will be produced. However, if either path is blocked, there will be no 30 kHz acoustic energy produced.

The system of the instant invention comprises several sources of ultrasonic energy and a single receiver. The sources are located at various points in a vehicle cabin so as to optimize access to the relevant volumes of space above the passenger or driver seat and behind the vehicle's instrument panel.

The system identifies the volume of space filled with a dense material by directing beams of ultrasonic energy such that they will intersect at preselected points within a three dimensional space. If the point of the beam's intersection is in air, the beams will interfere in a non-linear fashion such that a difference frequency will be produced. If the point of the beam's intersection is in a dense material, or one of the intersecting beams is blocked, the non-linear creation of the difference frequency will not take place. The point of intersection will be shifted in space by manipulating the beams.

The receiver 18, such as a microphone, detects the difference frequency. If the receiver senses no sound when the beams could be creating the frequency sound difference, then a determination is made that least one of the beams was blocked before reaching the point of intersection. On the other hand, if the frequency sound difference is detected, then a determination is made that the point of intersection is filled with air.

Referring to FIGS. 4 and 5, an important application of the instant invention is to identify when an occupant is within the danger zone 28 of the air bag inflator, i.e. too close to the air bag inflator door 30 at the time of impact so as to be at risk of injury from the deploying air bag inflator. While the specific extent of the danger zone 28 is dependent on the air bag design, it is presently generally accepted to extend approximately eight inches from the air bag inflator door 30.

Generally, an air bag suppression system designed to disable the air bag when the occupant is very close to the inflator must meet the following requirements.

1. It must monitor the volume immediately in "front" of the inflator module. The important volume is in the direction of air bag deployment, from the inflator door out to approximately eight inches from the inflator module door. The air bag must be disabled whenever the occupant penetrates this "at risk" zone.
2. It must have the speed necessary to disable the air bag "immediately" after the occupant enters the "at risk" zone. The key situation is when an unbelted passenger experiences pre-impact breaking which moves the occupant against the air bag inflator module immediately prior to impact. Acceptable effective update periods are less than 10 ms, which means that the disable decision will be made no more that 10 ms after the occupant penetrates the "at risk" zone in front of the inflator.

Referring to FIG. 4, in one possible embodiment of the instant invention as an air bag suppression system, ultrasonic transmitters 12 placed on either side of the air bag inflator door 30 so as to create beams 14 of ultrasonic sound waves directed such that their point of intersection at a detection region 16 is approximately eight inches directly in front of the air bag inflator door 30. The receiver 18 can be placed anywhere, but is best placed as close to the detection region 16 as possible since this will reduce the travel time of the difference frequency sound and make the system's lag as small as possible. This configuration is shown in the following sketch.

The ultrasonic sources preferably operate at frequencies such that the difference frequency is not audible(i.e. $f_1$=225 kHz, $f_2$=200 kHz). One of the ultrasonic sources should be modulated (50% duty cycle square wave) and the other should be continuous. The difference frequency is then demodulated using a synchronous demodulation scheme. This modulation scheme will eliminate any effects of the acoustic noise from the rest of the vehicle.

As illustrated in FIG. 5, preferably the ultrasonic transmitters 12 are adapted so that the beams 14.1 of ultrasonic sound waves are conically expanding so that the detection region 16 better approximates the danger zone 28. When there is a difference frequency signal present, the detection region 16, and therefore the danger zone 28, in front of the inflator module is clear and the air bag can be safely deployed. When the amplitude of the difference frequency demodulated signal falls dramatically there is an object or person in front of the inflator and the air bag is disabled. Additional information about the at risk volume can be obtained by using additional beams and listening for additional difference frequencies.

Advantages of this system over more conventional systems include

1. The delay between the occupant penetrating the at risk and recognition of this situation is reduced below almost any other sensor. The time for the "at risk" signal to get to the microphone is only a single time of flight between the point of intersection and the microphone. The difference frequency is being produced continuously (although modulated), and when it stops it means there is an object in one of the two ultrasonic source's beam paths.
2. The point of intersection stays constant and therefore the distance measured as the outside of the at risk zone stays constant. Conventional ultrasonic ranging systems calculate distance using the speed of sound which varies with temperature and altitude.
3. The entire system must be working to enable the air bag. The system works in such a way that if there are any undiagnosed problems with the system, the air bag will be disabled. OEMs prefer this to enabling on at risk cases when there is a fault in the supplemental restraint system. The vehicle occupant will be shown the air bag enable status with an indicator lamp located where it is clearly visible to the passenger and the driver.

Generally, the instant invention may incorporate a plurality of ultrasonic transducers 12 greater than two, wherein the individual ultrasonic transducers 12 are organized as a collection of pairs. In one embodiment, the frequencies of the associated ultrasonic transducers 12 are set such that the frequencies of the associated generated sound waves 17 are distinct. A sufficient number of associated detection regions 16 are tested for the presence of dense material which precludes the creation of associated generated sound waves 17, and such test results are stored and tracked to produce a three dimensional map of the probed space.

Figure 6:
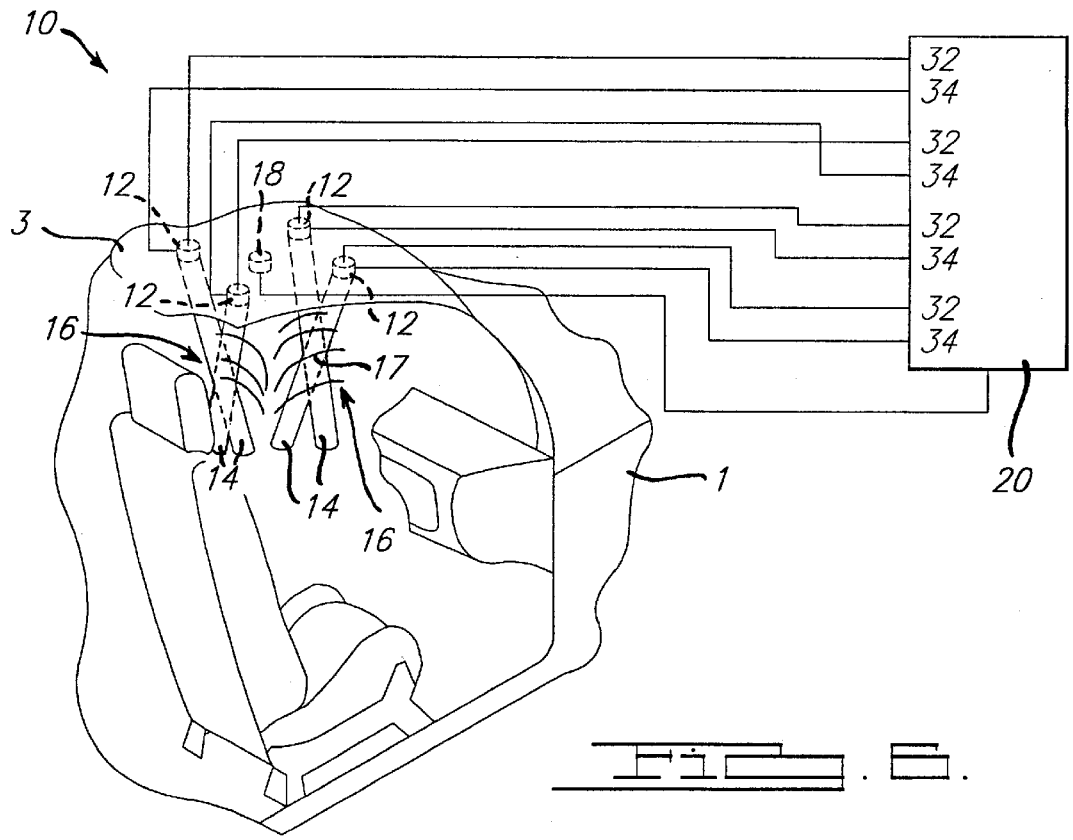
FIG. 6 illustrates an aspect of the instant invention having a plurality of ultrasonic transmitters incorporating a means for positioning the associated sound beams, shown positioned so as to form two distinct detection regions.
Figure 7:
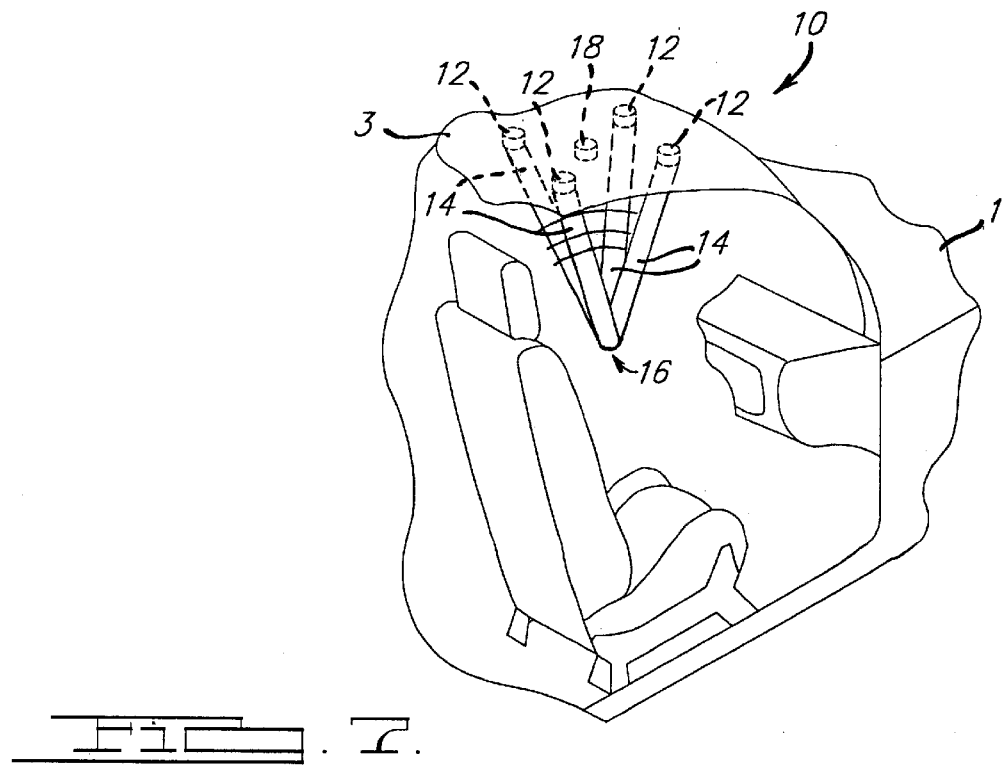
FIG. 7 illustrates an aspect of the instant invention having a plurality of ultrasonic transmitters incorporating a means for positioning the associated sound beams, shown positioned so as to form a single detection region.

Referring to FIG. 6, in one embodiment of the instant invention, the system is provided with four ultrasonic transmitters 12. Two ultrasonic transmitters 12 are placed in the headliner near the windshield, and two ultrasonic transmitters 12 are placed above the position of a typical occupant's shoulders. The ultrasonic transmitters 12 may either be directed at respective detection regions 16 which are at fixed locations in space, or as also indicated in FIG. 6, may be controllably directed in accordance with control signals 34 generated by the signal processor 20. For example, the individual ultrasonic transmitters 12 may be mechanically directed, or may be directed in accordance with a phased array in ultrasonic transmitting elements. Any combination of two of the sources are used to probe any volume segment. When an "empty volume segment" result is detected, then that segment is deemed void of dense objects. If all six possible source combinations (1-2, 1-3, 1-4, 2-3, 2-4, 3-4) give a "dense volume segment" then the that segment is determined to be filled with dense material. Because there are several different mixing combinations, the likelihood of all combinations of the beams being simultaneously blocked by something other than a person's body, e.g., a map or a newspaper, is low. Referring to FIG. 7, the ultrasonic transmitters 12 may also be directed at a common detection region 16 so that the occupant position sensor 10 remains operational in the event that one or two of the beams 14 become occluded.

Referring to FIG. 8, in another aspect of the instant invention, a first timer 36 gates the signals 32 to the ultrasonic transmitters 12 so that the beams 14 of ultrasonic sound waves comprise pulses 38 of ultrasonic sound waves, each containing more than one cycle of oscillation. The pulses 38 emanate from the ultrasonic transmitters 12 as spherical wavefronts 39 with lateral extents thereof preferably limited to be within the desired range of detection. At any given time, the separate spherical wavefronts 38 intersect in a circular detection region 16, whereby if an object occupies the space thereof, the total level of the generated sound waves 17 detected by the receiver 18 is diminished. A band pass filter having a center frequency corresponding to the frequency of the generated sound waves 17 extracts the signal corresponding to the level of generated sound waves 17, and a second timer 42 measures the time interval between the commencement of the generation of the beams 14, and the time at which the generated sound waves 17 are received by the receiver 18, thereby establishing the location of the associated detection region 16 at the particular point in time. While two second timers 42 are illustrated in FIG. 8, it will be clear to one of ordinary skill in the art that only one is required to make the associated measurement, and that this measurement may be made with respect to either ultrasonic transmitter 12 since the signals from the ultrasonic transmitters 12 are coherent with one anther. If the signal associated with a given associated detection region 16 are attenuated below a given threshold, then the signal processor 20 can infer that an object occupies the space of the circular detection region 16.

The location of the loci of points defining the detection region 16 as a function of time may be controlled by varying the relative time delay between the respective pulses 38, as illustrated in FIG. 8 for seven different delay conditions, wherein the delay d is expressed in FIG. 8 in terms of the associated propagation distance. The locations of these locii are given in the derivation hereinbelow in accordance with FIG. 8.

$$\frac{R_1}{\sin(\alpha)} = \frac{R_2}{\sin(\gamma)} \quad (1)$$

$$(R_1)^2 + B^2 - 2 \cdot R_1 \cdot B \cdot \cos(\gamma) = (R_2)^2 \quad (2)$$

$$\gamma = \mathrm{acos}\left[\frac{1}{2} \cdot \frac{[(R_1)^2 + B^2 - (R_2)^2]}{(R_1 \cdot B)}\right] \quad (3)$$

$$R_2 = R_1 + \quad (4)$$

$$\gamma = \mathrm{acos}\left[\frac{1}{2} \cdot \frac{[(R_1)^2 + B^2 - (R_1 + \delta)^2]}{(R_1 \cdot B)}\right] \quad (5)$$

$$x = R_1 \cdot \cos(\gamma) \quad (6)$$

$$y = R_1 \cdot \sin(\gamma) \quad (7)$$

$$x = \frac{B}{2} - \frac{R_1 \cdot \delta}{B} - \frac{\delta^2}{2 \cdot B} \quad (8)$$

$$y = \frac{\sqrt{[4 \cdot (R_1)^2 \cdot B^2 - B^4 + 4 \cdot B^2 \cdot R_1 \cdot \delta + 2 \cdot B^2 \cdot \delta^2 - 4 \cdot R_1 \cdot \delta^3 - \delta^4]}}{2 \cdot B} \quad (9)$$

where x and y are the coordinates of the detection region, and other symbols are defined in FIG. 8.

Referring to FIGS. 9 and 10, for a system with two ultrasonic transducers 12, the detection region at any given point in time is located in the circle of intersection of the associated two spherical wavefronts 39. Referring to FIGS. 11 and 12, an occupant position sensor 10 with three ultrasonic transducers 12 may be used to further localize the object to be detected, wherein the operating frequencies of the separate ultrasonic transducers 12 are preferably distinct from one another so that all ultrasonic transducers 12 can be operated simultaneously, thereby creating separate generated sound waves 17 corresponding to each of the three different detection regions 16 formed by the intersection of the separate pairs of spherical wavefronts 39. Once an object is detected for any two of the detection regions, the object can be further localized to the point of intersection thereof.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

I claim:

1. A sensor for detecting the presence of an object within a detection region of space, comprising:

a. a plurality of ultrasonic transmitters, each ultrasonic transmitter of said plurality of ultrasonic transmitters operating at a distinct transmitting frequency and positioned at a distinct location relative to the other of said plurality of ultrasonic transmitters, whereby the plurality of ultrasonic transmitters is organized as one or more pairs of ultrasonic transmitters and for each one of said one or more pairs of transmitters, the sound waves transmitted from associated ultrasonic transmitters combine within the detection region in space so as to create generated sound waves having a frequency substantially equal to the difference in transmitting frequencies of the associated said ultrasonic transmitters in said pair;

b. a receiver disposed so as to receive said generated sound waves, whereby said receiver generates a signal responsive to the level of said generated sound waves; and c. a signal processor operatively coupled to said receiver for determining whether an object is located within said detection region responsive to said signal from said receiver.

2. A sensor for detecting the presence of an object within a detection region of space as recited in claim 1, wherein said detection region is localized.

3. A sensor for detecting the presence of an object within a detection region of space as recited in claim 2, further comprising a means for controlling the direction at which the sound waves from one or more ultrasonic transmitters of said plurality of ultrasonic transmitters are transmitted, whereby the location of said detection region is controlled responsive to said signal processor.

4. A sensor for detecting the presence of an object within a detection region of space as recited in claim 1, further comprising:

a. a first timer for controlling the activation times of one or more ultrasonic transmitters of said plurality of ultrasonic transmitters;

b. a second timer for measuring the time interval between said activation time and the time at which said signal is generated by said receiver, whereby said signal processor further determines the profile of the object responsive to a plurality of measurements of said signal from said receiver and the corresponding said time interval.

5. A sensor for detecting the presence of an object within a detection region of space as recited in claim 1, further comprising one or more bandpass filters for passing the frequency of said generated sound waves in said signal.

6. A sensor for detecting the presence of an object within a detection region of space as recited in claim 4, further comprising one or more bandpass filters for passing the frequency of said generated sound waves in said signal.

7. A system for sensing an object and for controlling the activation of a safety restraint system responsive thereto, comprising:
   a. a plurality of ultrasonic transmitters, each ultrasonic transmitter of said plurality of ultrasonic transmitters operating at a distinct transmitting frequency and positioned at a distinct location relative to the other of said plurality of ultrasonic transmitters, whereby the plurality of ultrasonic transmitters is organized as one or more pairs of ultrasonic transmitters and for each one of said one or more pairs of transmitters, the sound waves transmitted from associated ultrasonic transmitters combine within a detection region in space so as to create generated sound waves having a frequency substantially equal to the difference in transmitting frequencies of the associated said ultrasonic transmitters in said pair;
   b. a receiver disposed so as to receive said generated sound waves, whereby said receiver generates a signal responsive to the level of said generated sound waves; and
   c. a signal processor operatively coupled to said receiver for determining whether the object is located within said detection region responsive to said signal from said receiver and for controlling the activation of a safety restraint system responsive to whether the object is located in said detection region.

8. A system for sensing an object and for controlling the activation of a safety restraint system responsive thereto as recited in claim 7, wherein said detection region is localized.

9. A system for sensing an object and for controlling the activation of a safety restraint system responsive thereto as recited in claim 8, further comprising a means for controlling the direction at which the sound waves from one or more ultrasonic transmitters of said plurality of ultrasonic transmitters are transmitted, whereby the location of said detection region is controlled responsive to said signal processor.

10. A system for sensing an object and for controlling the activation of a safety restraint system responsive thereto as recited in claim 7, further comprising:
   a. a first timer for controlling the activation times of one or more ultrasonic transmitters of said plurality of ultrasonic transmitters;
   b. a second timer for measuring the time interval between said activation time and the time at which said signal is generated by said receiver, whereby said signal processor further determines the profile of the object responsive to a plurality of measurements of said signal from said receiver and the corresponding said time interval.

11. A system for sensing an object and for controlling the activation of a safety restraint system responsive thereto as recited in claim 8, wherein said detection region substantially comprises the danger zone of the safety restraint system.

12. A method for detecting the presence of an object within a detection region of space, comprising:
   a. from a first location, directing a first ultrasonic sound wave at the detection region in space;
   b. from a second location distinct from said first location, directing a second ultrasonic sound wave at the detection region in space wherein the magnitude of said first and second ultrasonic sound waves is sufficient to cause a third sound wave to be generated from the detection region in space having a frequency which is substantially equal to the difference in frequencies of said first and second ultrasonic sound waves, whereby said third sound wave is generated if the detection region in space is not occupied by an object;
   c. detecting the magnitude of said third sound wave;
   d. comparing said magnitude of said third sound wave to a threshold; and
   e. determining if an object is located within the detection region in space if the magnitude of said third sound wave is less than said threshold.

13. A method for detecting the presence of an object within a detection region of space as recited in claim 12, further comprising the operation of controlling the location of the detection region in space by controlling the direction of one or both of said first and second ultrasonic sound waves.

14. A method for detecting the presence of an object within a detection region of space as recited in claim 12, further comprising the operations of:
   a. activating said first ultrasonic sound wave over a first time interval;
   b. activating said second ultrasonic sound wave over a second time interval;
   c. measuring the time interval between the activation of said first ultrasonic wave and the time at which said third sound wave is detected;
   d. associating the location of a specific region in space with said time interval; and
   e. determining if an object is located within said specific region in space if the magnitude of said third sound wave is less than said threshold.

15. A method for detecting the presence of an object within a detection region of space as recited in claim 12, further comprising the operations of:
   a. detecting said third sound wave so as to generate a signal; and
   b. filtering said signal with a bandpass filter having a center frequency substantially equal to the difference in frequency of said first and second ultrasonic sound waves.

16. A method for sensing an object in a vehicle seat and for controlling the activation of a safety restraint system responsive thereto, comprising:
   f. from a first location, directing a first ultrasonic sound wave at a detection region in space;
   g. from a second location distinct from said first location, directing a second ultrasonic sound wave at said detection region in space wherein the magnitude of said first and second ultrasonic sound waves is sufficient to cause a third sound wave to be generated from said detection region in space having a frequency which is substantially equal to the difference in frequencies of said first and second ultrasonic sound waves, whereby said third sound wave is generated if said detection region in space is not occupied by an object;
   h. detecting the magnitude of said third sound wave;
   i. comparing said magnitude of said third sound wave to a threshold;
   j. determining if an object is located within said detection region in space if the magnitude of said third sound wave is less than said threshold; and
   k. controlling the activation of the safety restraint system responsive to when and object is detected within said detection region of space.

17. A method for sensing an object in a vehicle seat and for controlling the activation of a safety restraint system responsive thereto as recited in claim 16, further comprising the operation of controlling the location of the detection region in space by controlling the direction of one or both of said first and second ultrasonic sound waves.

18. A method for sensing an object in a vehicle seat and for controlling the activation of a safety restraint system responsive thereto as recited in claim 16, further comprising the operations of:

a. activating said first ultrasonic sound wave over a first time interval;

b. activating said second ultrasonic sound wave over a second time interval;

c. measuring the time interval between the activation of said first ultrasonic wave and the time at which said third sound wave is detected;

d. associating the location of a specific region in space with said time interval; and e. determining if an object is located within said specific region in space if the magnitude of said third sound wave is less than said threshold.

* * * * *